US009009229B2

(12) United States Patent
Savir et al.

(10) Patent No.: US 9,009,229 B2
(45) Date of Patent: Apr. 14, 2015

(54) DEVICE, SYSTEM, AND METHOD OF SHARING SOCIAL NETWORK INFORMATION

(71) Applicants: Eran Savir, Hod Hasharon (IL); David Rachamim, Tel Aviv (IL)

(72) Inventors: Eran Savir, Hod Hasharon (IL); David Rachamim, Tel Aviv (IL)

(73) Assignee: SeatID Ltd., Hod Hasharon (IL)

( * ) Notice: Subject to any disclaimer, the term of this patent is extended or adjusted under 35 U.S.C. 154(b) by 227 days.

(21) Appl. No.: 13/671,572

(22) Filed: Nov. 8, 2012

(65) Prior Publication Data

US 2014/0129629 A1 May 8, 2014

(51) Int. Cl.
*G06F 15/16* (2006.01)
*H04L 29/08* (2006.01)

(52) U.S. Cl.
CPC .................... *H04L 67/26* (2013.01)

(58) Field of Classification Search
CPC ..... H04L 12/5865; H04L 67/24; H04L 67/26; H04L 67/306; H04L 29/08; G06F 17/30; G06F 17/30277; G06Q 10/02; G06Q 50/01
USPC .................................................. 709/204, 206
See application file for complete search history.

(56) References Cited

U.S. PATENT DOCUMENTS

| 5,311,425 | A | * | 5/1994 | Inada | 705/6 |
| 2004/0181438 | A1 | * | 9/2004 | Hoene et al. | 705/5 |
| 2008/0091445 | A1 | * | 4/2008 | Mihic | 705/1 |
| 2009/0248457 | A1 | * | 10/2009 | Munter et al. | 705/5 |
| 2010/0205605 | A1 | * | 8/2010 | Johnson et al. | 718/102 |
| 2011/0087506 | A1 | * | 4/2011 | Barillec et al. | 705/5 |
| 2013/0054375 | A1 | * | 2/2013 | Sy et al. | 705/14.66 |
| 2013/0166329 | A1 | * | 6/2013 | Arnoux-Prost et al. | 705/5 |
| 2014/0052482 | A1 | * | 2/2014 | Le Marier et al. | 705/5 |
| 2014/0115057 | A1 | * | 4/2014 | O'Sullivan et al. | 709/204 |

* cited by examiner

*Primary Examiner* — Wing F Chan
*Assistant Examiner* — Benjamin M Thieu
(74) *Attorney, Agent, or Firm* — Eitan, Mehulal & Sadot

(57) ABSTRACT

Device, system, and method of sharing social network information. A method of sharing social information includes: obtaining from a social network social information of passengers associated with a flight; and presenting the social information to a prospective passenger of said flight. The obtaining includes obtaining from the social network in bulk social information of at least two passengers associated with a flight, by sending a query which includes an identifier of said flight, and which excludes any identifier of any passenger on said flight.

20 Claims, 5 Drawing Sheets

DEVICE, SYSTEM, AND METHOD OF SHARING SOCIAL NETWORK INFORMATION

FIELD OF THE INVENTION

The present invention relates to the field of information technology.

BACKGROUND

Millions of users worldwide utilize a social network in order to communicate and share information with family members and friends. A social network, for example, Facebook, LinkedIn, or Google Plus, may include a website or an Internet-based service which allows users to create and maintain a personal profile or personal page, to befriend or to "like" or to "follow" other users, to share text and images with other users, to perform blogging activities, or the like.

A user of a social network may create a personal profile or a personal page, in which he may store data intended for sharing with other users of the social network, data which may be referred to as "social information". Social information may include, for example, an image or photograph of the user, a gender of the user, an age or a date of birth of the user, a marital status or family status of a user, a profession or occupation of the user, current and past employer(s) of the user, current or past school(s) attended by the user, a hobby or interest of the user, a city or state or country in which the user lives or originates, or the like.

SUMMARY

The present invention may include, for example, devices, systems, methods, computerized programs and computerized application for sharing social information among users. For example, a user may access an airline website in order to reserve a flight. The user may consent to sharing his social information with other passengers on that flight; and upon such consent, the user may be able to view social information of fellow passengers on that particular flight. Furthermore, when the user selects a seat on that flight, the user may be presented with a seating chart or a seating map showing available and occupied seats, augmented by social information of passengers in occupied seats.

In accordance with the present invention, for example, a method of sharing social information may include: obtaining from a social network social information of passengers associated with a flight; and presenting said social information to a prospective passenger of said flight.

In accordance with the present invention, for example, the obtaining may include: obtaining from the social network in bulk social information of at least two passengers associated with a flight.

In accordance with the present invention, for example, the obtaining may include: sending a query which includes an identifier of said flight, and which excludes any identifier of any passenger on said flight.

In accordance with the present invention, for example, the obtaining may include: in response to a single query identifying only a particular flight, obtaining a batch of social information items of at least two passengers on said particular flight.

In accordance with the present invention, for example, the presenting may include: presenting a seating map for said flight indicating available seats and occupied seats; and for at least one occupied seat, presenting social information of a passenger occupying said occupied seat.

In accordance with the present invention, for example, the method may include: calculating a social relevance score for each one of said passengers associated with said flight; and ranking said passengers based on said social relevance score.

In accordance with the present invention, for example, calculating the social relevance score may include: identifying common traits among passengers of said flight.

In accordance with the present invention, for example, the method may include: allocating a first weight to a first common trait of a pair of passengers, and allocating a second, different, weight to a second common trait of said pair of passengers.

In accordance with the present invention, for example, the method may include: based on said ranking, matching between a first passenger of said flight, and one or more other passengers-of-interest to said first passenger.

In accordance with the present invention, for example, the method may include: receiving flight identification data from a flight booking system; obtaining social information of passengers for said flight; serving to said flight booking system said social information.

In accordance with the present invention, for example, the method may include: establishing a first instance of Oauth protocol with a social network, comprising: assigning to the social network a role of a server, and assigning to an intermediate module a role of a client; and establishing a second, separate, instance of OAuth protocol with a flight booking system, comprising: assigning to the intermediate module a role of a server, and assigning to the flight booking system a role of a client.

In accordance with the present invention, for example, the method may include: displaying a flight search result page which comprises: identifiers of one or more flights, and social information of passengers in each one of said one or more flights.

In accordance with the present invention, for example, the method may include: presenting a seating map for said flight indicating available seats and occupied seats; and presenting near the seating map a social widget for displaying social information of passengers in said flight.

In accordance with the present invention, for example, the method may include: presenting a mock widget to elicit a user to log-in into a service which permits said user to share social information with other passengers on said flight.

In accordance with the present invention, for example, the method may include: displaying a seat map of said flight, the seat map indicating which one or more seats are available and which one or more seats are reserved; and upon a user pointing at a reserved seat on said seat map, displaying social information of a passenger that reserved said seat.

In accordance with the present invention, for example, the method may include: displaying a seat map of said flight, the seat map indicating which one or more seats are available and which one or more seats are reserved; and for at least one seat that is reserved, displaying at a location of said seat in the seat map an image of a passenger that reserved said seat.

In accordance with the present invention, for example, the obtaining may include: obtaining social information of at least a first passenger and a second passenger on said flight, wherein the first passenger is a passenger who booked the flight through a website of an airline that operates said flight, and wherein the second passenger is a passenger who booked the flight through a website external to the website of said airline that operates said flight.

In accordance with the present invention, for example, the method may include: suggesting to said prospective passenger a seat in said flight, based on one or more common traits identified by matching between social information of said prospective passenger and social information of other one or more passengers on said flights.

In accordance with the present invention, for example, the method may include: taking into account a feedback received from said prospective passenger regarding a previously-performed seat selection that was based on social information in a previous flight.

In accordance with the present invention, for example, the method may include: sending to said prospective passenger a notification indicating a change in seating assignment of another passenger on said flight, the notification indicating a seat of said other passenger on said flight and further including social network information of said other passenger.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF THE PRESENT INVENTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

The present invention may allow sharing of social information among prospective passengers who utilize an airline website or a flight reservation website. A user who considers or intends to reserve a particular flight, or is in the process of reserving a particular flight, may choose to share his social information with other passengers on that flight. The user may then be able to view the social information of other passengers on that flight who consented to share their social information with fellow passengers. Particularly, in a seat selection process, a seating chart may be augmented with social information of passengers, thereby allowing the user to select a seat by taking into account the social information of other passengers in nearby seats. The present invention may be implemented, for example, within an airline booking system or website (e.g., a website such as United.com or Delta.com), within an Online Travel Agency (OTA) system or website (e.g., a website such as Expedia.com or Orbitz.com), or the like.

Figure 1A:
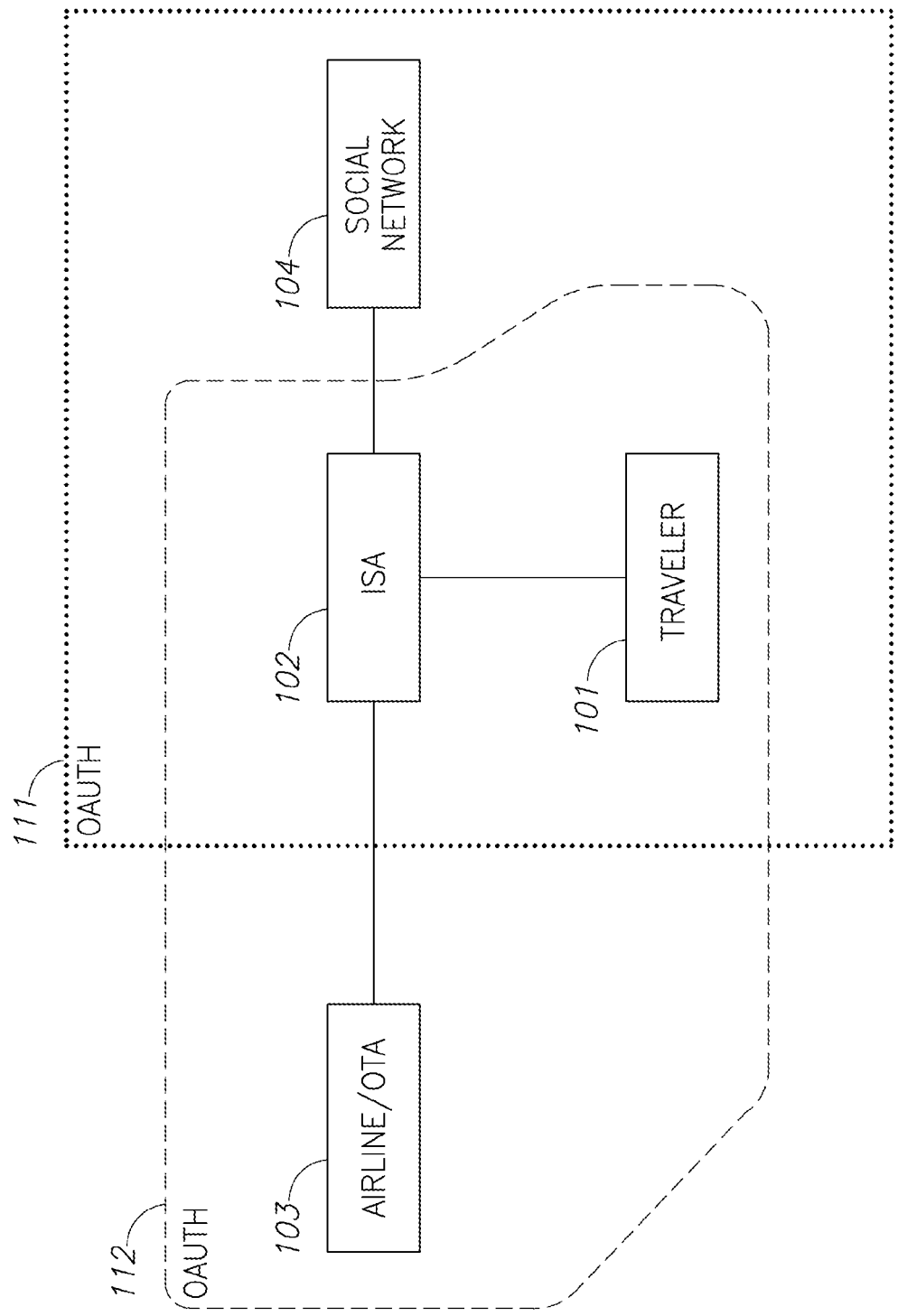
FIG. 1A is a schematic block diagram illustration of entities and modules which may participate in a demonstrative implementation of the present invention.

Reference is made to FIG. 1A, which is a schematic block diagram illustration of entities and modules which may participate in a demonstrative implementation of the present invention. As shown in FIG. 1A, a traveler 101 may utilize an information sharing application (ISA) 102, which may be able to communicate with an airline/OTA system 103 and with a social network 104.

Social network information of travelers may be shared among consenting travelers without requiring airline/OTA system 103 to provide any information, and without requiring airline/OTA system 103 to pass to ISA 102 any personal information of traveler 101 (e.g., the real-life name of traveler 101 or his passport number). Rather, ISA 102 may ask traveler 101 for his permission or consent to obtain his social information directly from social network 104, and to share his obtained social information with fellow travelers within the scope of airline/OTA system 103.

ISA 102 may request permissions, obtain information, and share information in accordance with a suitable protocol or standard, for example, OAuth standard, OAuth 1.0 standard, OAuth 2.0, or the like, optionally utilizing also a suitable user-authentication standard (e.g., OpenID standard). In a demonstrative implementation, ISA 102 may utilize the OAuth standard which may assign four roles, for example, a resource owner, a client, a resource server, and an authorization server. In interactions among ISA 102, traveler 101, and social network 104, the role of resource owner may be assigned to traveler 101, the role of the client may be assigned to ISA 102, and the roles of resource server and authorization server may be assigned to social network 104. In interactions among ISA 102, traveler 101, and airline/OTA system 103, the role of the resource owner may still be assigned to traveler 101, whereas the role of the client may be assigned to airline/OTA system 103, and whereas the roles of the resource server and authentication server may be assigned to ISA 102.

An end-to-end process of authenticating traveler 101 and accessing his social information may be achieved, for example, by combining two separate OAuth-like protocols. For example, a first OAuth protocol 111 may be implemented between ISA 102 and social network 104, and a second OAuth protocol 112 may be implemented between ISA 102 and airline/OTA system 103. ISA 102 may operate as the client when accessing social information of traveler 101 on social network 104; and ISA 102 may operate as the resource server and authentication server when providing or serving the social information of traveler 101 to airline/OTA system 103.

Traveler 101 may utilize a computer or mobile phone or other electronic device to access a website of airline/OTA system 103, for example, in order to search for a flight or to book a flight. Traveler 101 may be presented with an option to share and view social information. If traveler 101 approves, the website of airline/OTA system 103 may redirect traveler 101 to an authentication page or module of ISA 102 (e.g., a user authentication URL of ISA 102), thereby triggering a first OAuth flow between ISA 102 and airline/OTA system 103. Upon such redirection from airline/OTA system 103 to ISA 102, user authentication may be performed by ISA 102, in order to obtain user permission to access his social information. For example, ISA 102 may display to traveler 101 a login screen, with an option to log-in to one of multiple social networks (e.g., Facebook, LinkedIn, Google Plus). Accordingly, ISA 102 may request from traveler 101 his permission to access his information in one of several social network by logging into a particular social network, for example, redirecting traveler 101 to an authentication URL of a particular user-selected social network 104, thereby triggering a second OAuth flow between ISA 102 and social network 104. Traveler 101 may thus be presented with a login screen of social network 104 (or, the login screen may be bypassed if traveler 101 is already logged in to social network 104), and then a form or question may be displayed to obtain approval of traveler 101 for sharing his social information with ISA 102. Once traveler 101 approves such sharing, he may be redirected back to ISA 102, where he may be presented with a form or a question to obtain approval of traveler 101 for sharing his social information with airline/OTA system 103. Once traveler 101 approves, he may be redirected back to airline/OTA system 103, thereby completing the authorization flow and allowing airline/OTA system 103 to access the social information of traveler 101 indirectly through ISA 102. For example, a token may be provided by ISA 102 to airline/OTA system 103 upon successful authentication, and airline/OTA system 103 may utilize that token in subsequent queries.

It would be appreciated by persons of ordinary skill in the art that in the above-described flow, airline/OTA system 103 may not provide any data about traveler 101; rather, data about traveler 101 may only be retrieved from social network 104 after obtaining permission of traveler 101. Accordingly, during user authentication and user authorization, no user data is provided by airline/OTA system 103, or by a particular airline which operates airline/OTA system 103. Once traveler 101 is authenticated by ISA 102, and once traveler 101 authorizes airline/OTA system 103 to access the social information of traveler 101 through ISA 102, then airline/OTA system 103 may query ISA 102 on behalf of traveler 101. The query may be, for example, a query for information about all travelers on a particular flight, that traveler 101 booked already or considers booking. The query may indicate the airline or carrier, the fight number, and the flight date; whereas the query may not indicate the real-life name or a passport number (or a national ID card number) of traveler 101 or of other passengers on that flight. In response to such query, ISA 102 may provide to airline/OTA system 103 the social information of passengers on the queried flights, such social information including, for example, a screen-name or user-name of each such passenger (on social network 104), an image of such passenger, a gender of such passenger, an age of such passenger, or the like. Subsequently, traveler 101 may select a seat on the flight, and airline/OTA system 103 may indicate to ISA 102 the seat location and a token pointing to the social data of the seat holder, the token then being used by ISA 102 to obtain the social data of the seat holder from social network 104. ISA 102, in turn, may save or store links between seats and travelers that were already resolved, and such data may be provided to airline/OTA system 103 in a subsequent query.

Traveler 101 may search for flights through airline/OTA system 103, and may show interest in a particular flight. Airline/OTA system 103 may request from ISA 102 social information of travelers on that particular flight. ISA 102 may retrieve the list of travelers whose seats on this flight were already reported by airline/OTA system 103 to ISA 102, and ISA 102 may obtain the social information of such travelers from social network 104 and may provide such social information back to airline/OTA system 103 which may display the social information to traveler 101. Upon flight selection and seat selection by traveler 101, airline/OTA system 103 may notify ISA 102 of such flight selection and seat selection, and ISA 102 may store this information to be used in a subsequent query from airline/OTA system 103.

Optionally, ISA 102 may be integrated into a website of an airline or an OTA, at one or more suitable web-pages or place(s) within a web-page. The interaction of traveler 101 with ISA 102 may include, for example, signing in by traveler 101 into the service provided by ISA 102; displaying social information of fellow travelers (and optionally, passenger list) on flight search result page(s) and/or on flight details page(s); and displaying social information of passengers (and optionally, passenger list) on or with a seat map of a particular flight.

Figure 1B:
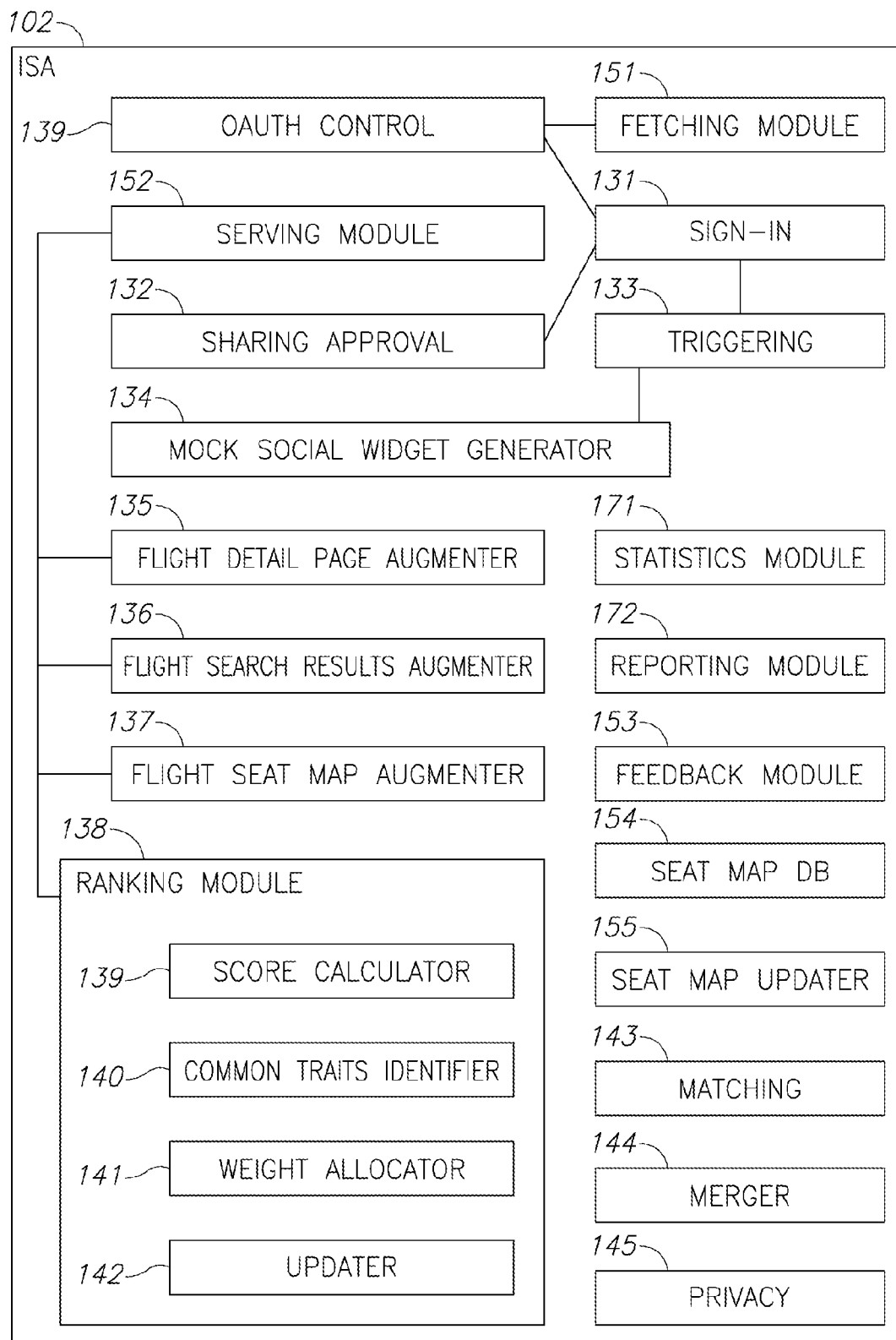
FIG. 1B is a block diagram illustration of an information sharing application and its components and modules, in accordance with the present invention.

Reference is also made to FIG. 1B, which is a block diagram illustration of ISA 102 and its components and modules, in accordance with the present invention. ISA 102 may include, for example, an OAuth control module 150, a social information fetching module 151, a social information serving module 152, a sign-in module 131, sharing approval module 132, a triggering module 133, a mock social widget generator 134, a flight details page augmenter 135, a flight search results augmenter 136, a flight seat map augmenter 137, a ranking module 138, a matching module 143, social information merger 144, privacy module 145, a statistics module 171, a reporting module 172, a feedback module 153, a seat map database 154, a seat map updater 155, and/or other suitable hardware components and/or software modules. Some components or modules may be implemented using a processor or a computer program, or may be combined or integrated into one unit or into multiple sub-units.

OAuth module 130 may establish and operate the multiple sessions of OAuth which may be used by ISA 102, as detailed above, such that ISA 102 may obtain the social information as a "client" from social network 104, and may provide the social information as a "server" to airline/OTA system 103. Social information fetching module 151 may be responsible for fetching or obtaining the social information from social network 104; whereas social information serving module 152 may be responsible for serving or providing the obtained social information to airline/OTA system 103.

Sign-in module 131 may handle signing-in or logging-in of traveler 101, which may be required of traveler 101 in order to provide and/or receive social information. A user who browses an airline website or an OTA website without logging-in to ISA 102 may not be able to view social information of other travelers, and may not be able to share his social information with other travelers.

Sharing approval module 132 may handle the process of obtaining approval from traveler 101 to share his social information with fellow travelers. For example, once traveler 101 logs-in into ISA 102 and provides user consent to share social information on an airline or OTA website, the social information of fellow travelers may become available to traveler 101. Traveler 101 may sign-in and provide his consent through an OAuth authentication flow, which may run in a main window or in a current window (e.g., of a website of the airline or OTA), or in a pop-up window or pop-up layer, e.g., in response to a trigger on the website which opens such pop-up.

Triggering module 133 may generate, or may present to the user, one or more triggers to elicit the user to sign-in to ISA 102 and to add social information capabilities to a flight reservation web-page that the user is browsing. For example, a trigger for launching a sign-in interface may be an explicit button or link on the airline/OTA website, which may read "sign-in with a social network to view social information of fellow passengers". Such button or link may be placed, for example, in a home page or a landing page of the airline/OTA website, thereby allowing the user to log-in to social information sharing before even searching for flights. Additionally or alternatively, the button or link may be placed in a search result page, and optionally, subsequent to user log-in, the airline/OTA website may re-render the search results to include the social information of fellow travelers. Additionally or alternatively, the button or link may be placed in a seat map web-page, and optionally, subsequent to user log-in, the airline/OTA website may re-render the seat map to include the social information of fellow travelers Another trigger for launching a sign-in interface may be a search button of a flight search interface of the airline/OTA website. For example, the user may fill-out flight parameters (e.g., flight date, origin airport, and destination airport), and may click on a "search flights" button or link. In response, the airline/OTA website may display a "search in progress" page while the search is performed; and such page may include the sign-in interface (or a link or button leading to the sign-in interface) for sharing and obtaining social information of fellow travelers.

Mock social widget generator 134 may present to the user a mock social widget or a mock social network application or module, as another trigger for signing-in. For example, a scrollable grid or list of empty images or grayed-out images or blurred-out images or anonymous images may be presented, as a mock of a real seat map which includes real social information, in order to capture the attention of a user who searches for flights. Upon hover or on click by the user on the mock item(s), the sign-in interface may be displayed. In some implementations, optionally, the social widget may include incomplete social information (e.g., passenger images but not passenger names; passenger genders but not passenger names), and complete information may be presented only upon signing-in. Once the user signs-in, the relevant page may be re-rendered to show the complete social information of fellow passengers.

Figure 2:
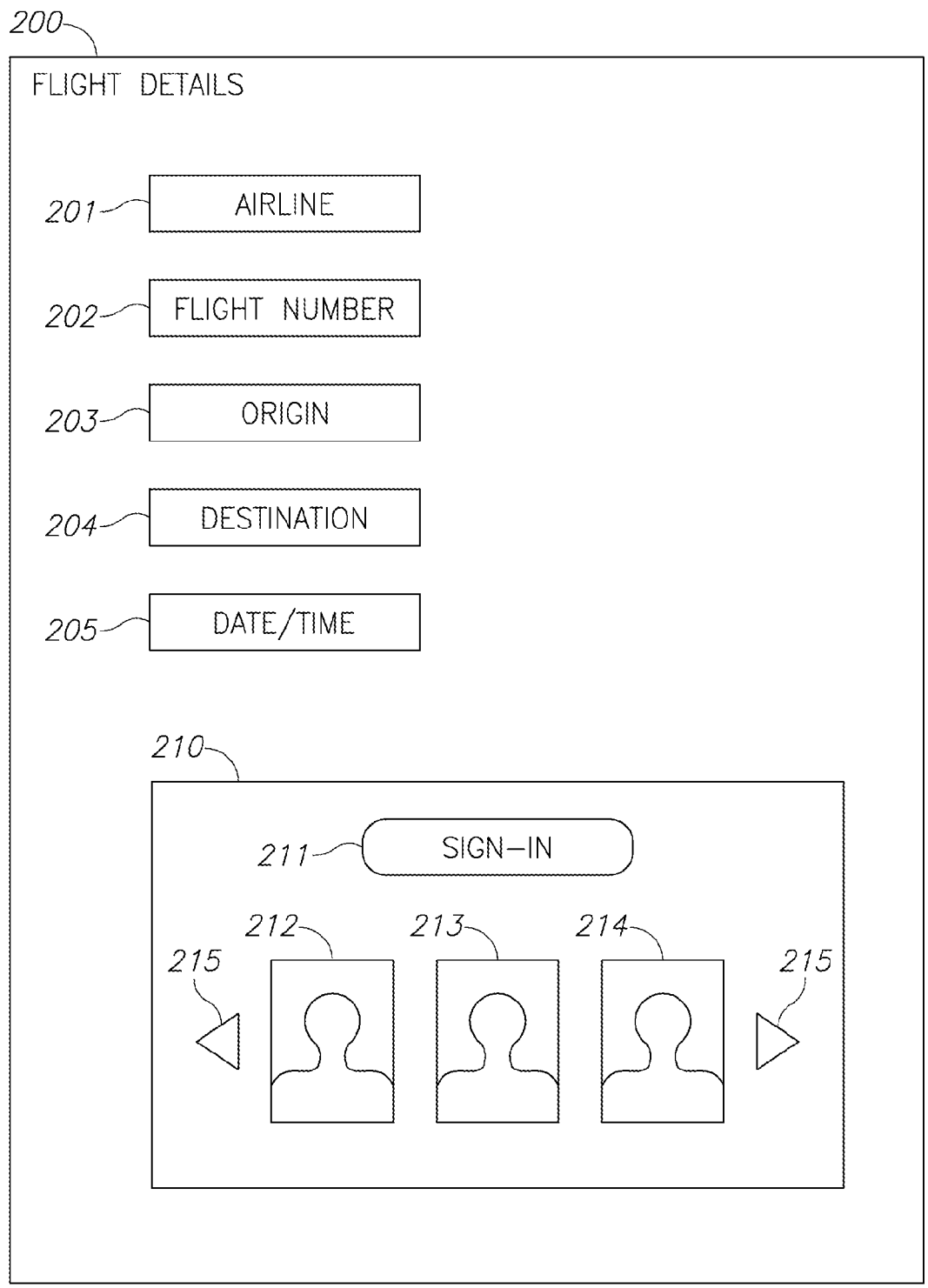
FIG. 2 is a schematic illustration of an augmented flight details page, in accordance with the present invention.

Flight details page augmenter 135 may include a module to augment a flight details page with social information of fellow passengers. For demonstrative purposes, reference is made to FIG. 2, which is a schematic illustration of a flight details page 200, in accordance with the present invention. Flight details page 200 may include, for example, an airline (or carrier) identifier 201, a flight number 202, a flight origin 203, a flight destination 204, flight date/time information 205, and a mock social widget 210 showing anonymous images 212-214 of passengers, optionally accompanied by an invitation 211 to sign-in to see social information of fellow passengers on the flight, and optionally accompanied by mock scrolling elements 215 or other mock interface components.

Figure 3:
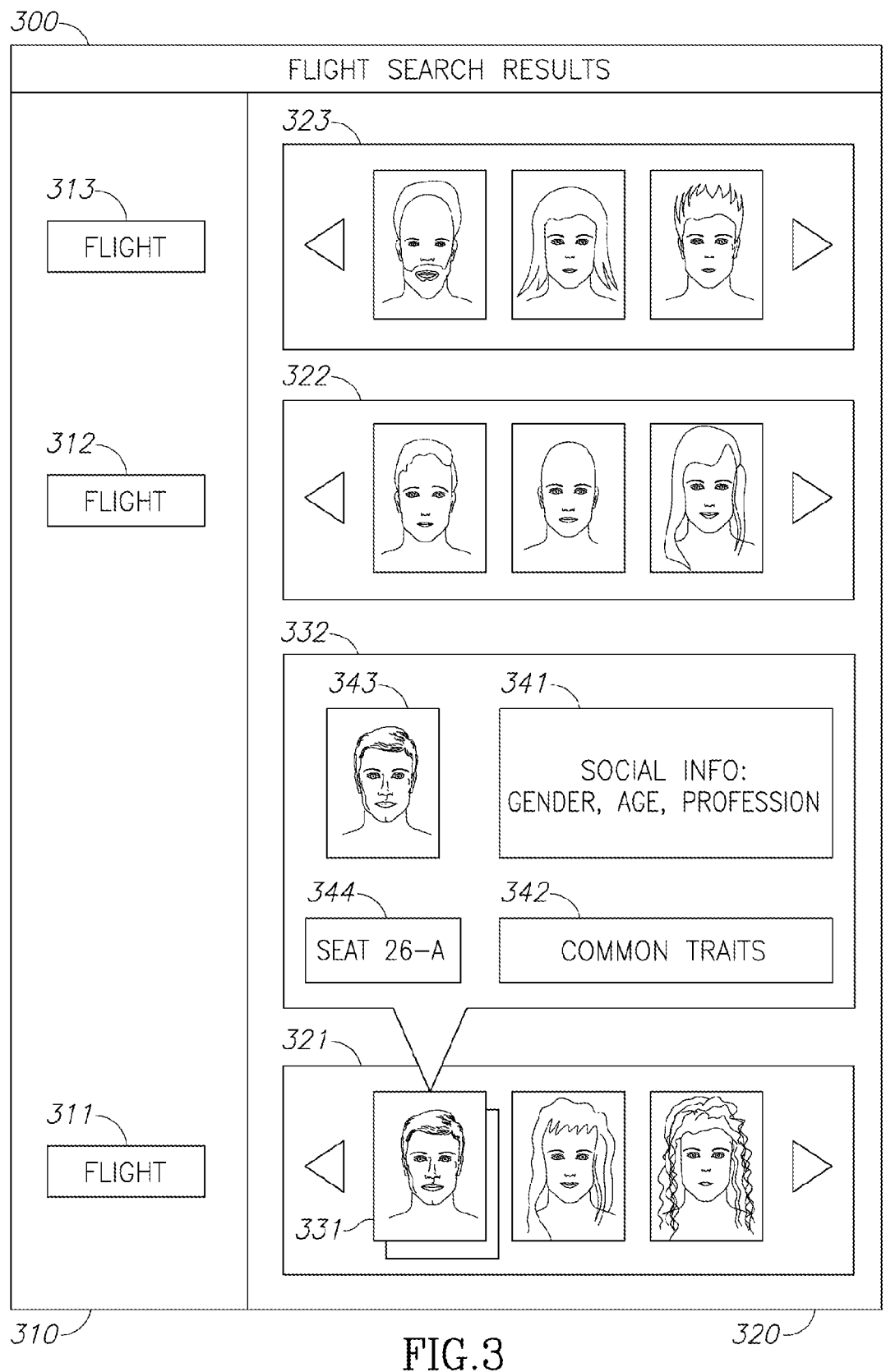
FIG. 3 is a schematic illustration of an augmented flight search results page, in accordance with the present invention.

Flight search results augmenter 136 may include a module to augment a flight search results page with social information of fellow passengers. For demonstrative purposes, reference is made to FIG. 3, which is a schematic illustration of a flight search results page 300, in accordance with the present invention. Flight search results page 300 may include, for example, a search results pane 310 having one or more flight search results items 311-313, and a social widget pane 320 showing multiple lists 321-323 of passengers on each respective flight. Each list 321-323 may include some passengers, for example, 3 or 4 or 5 passengers, who consented to share their social information with fellow travelers. Passenger images in each list 321-323 may be sorted, for example, based on social relevance to the current user (e.g., based on geographic proximity, gender, profession, age, age group, common interests, having one or more common friends, or the like). Each list 321-323 may be scrollable, allowing the user to scroll (e.g., sideways) to view additional list members. Optionally, hovering over (or clicking on, or touching) an image in each list 321-323 may cause a pop-up window or layer to be displayed, showing additional or extended social information for the selected passenger (e.g., passenger name, title, profession, gender, age, marital status, geographic location). For demonstrative purposes, an image 331 in list 321 is shown in a "clicked" status, such that an extended information panel 332 is shown. Optionally, extended information panel 332 may include additional social information or social insights, for example, indicating a common interest or a common hobby or a common educational institution shared between the user and the selected fellow passenger. In a demonstrative embodiment of the present invention, extended information panel 332 may include, for example, social information 341, common traits 342 of the passenger with the current user, passenger image 343, and an indication of a flight seat 344 allocated to that passenger. It is noted that extended information panel 332 depicts only a few demonstrative fields and social information items, which are shown for demonstrative purposes; and other and/or additional social information items may be presented in extended information panel 332, for example, location or residence of the user, hobbies or interests of the user, social buttons which may perform a social network action (e.g., "follow" or "add as a friend"), social links which may link to a user page or a user profile in a social network (e.g., a button marked with "f" to link to a user's Facebook page, a button marked with "t" to link to a user's Twitter page), or the like.

Figure 4:
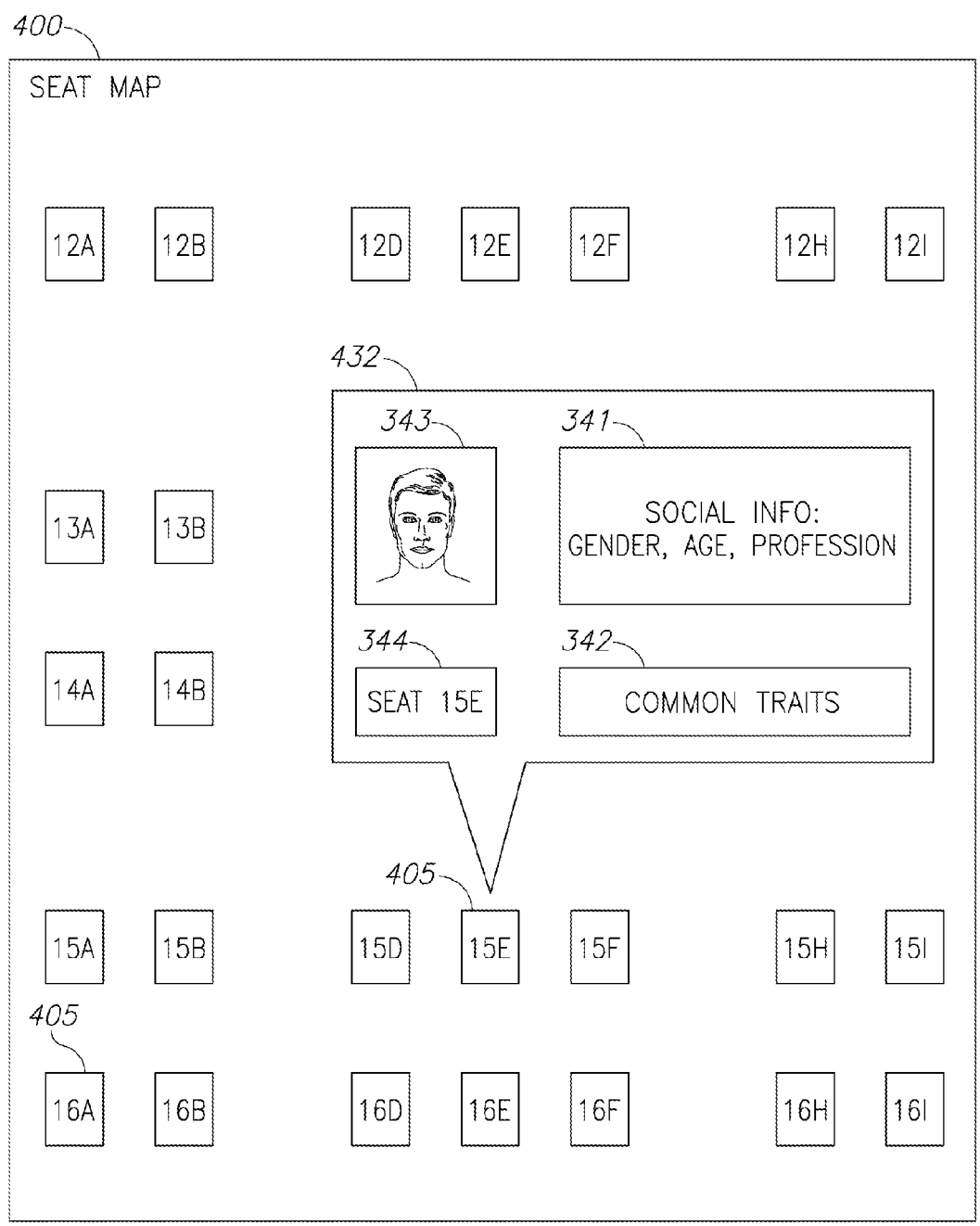
FIG. 4 is a schematic illustration of an augmented flight seat map incorporating therein social information of passengers, in accordance with the present invention.

Flight seat map augmenter 137 may include a module to augment a flight seat map with social information of fellow passengers. For demonstrative purposes, reference is made to FIG. 4, which is a schematic illustration of a flight seat map 400 incorporating therein social information of passengers, in accordance with the present invention. Flight seat map 400 may include multiple squares 401 or other graphical elements representing seat assignment, each one of squares 401 being associated with a row number and a seat number (e.g., seat 27-A, seat 24-B, or the like), and may be associated with a color code or a symbol indicating whether the seat is already booked or available. A user that is signed-in to ISA 102 may be able to view flight seat map 400 augmented with social information, which may be presented in an overlay layer or a pop-up panel or window, optionally triggered by a hover-on or mouse-on or clicking or touching a particular seat. For example, seat 405 is shown with an extended information panel 432 pertaining thereto, which may be generally similar to extended information panel 332 of FIG. 3. Optionally, social information of passengers may be presented in other suitable ways, for example, as a list of passengers side-by-side near seat map 400, or under or above seat map 400, or in a separate layer or window.

Optionally, flight seat map 400 may include, or may be accompanied by, a social widget 450 showing a full list or a scrollable list of images of passengers on that flight who consented to sharing their social information with fellow passengers. Each image in list 451 may be selectable or clickable, or may be hovered upon, thereby causing an extended information panel (e.g., similar to panel 432) to be opened and display the extended social information for the selected passengers.

Seat map updater 155 may be responsible for creating and updating a seat map for each particular flight, the seat map being stored in seat map database 154. The seat map may include augmented information (e.g., social information) of passengers on each such particular flight, information obtained from social network 104, and/or information regarding seat occupancy (associated with a user-related token) received from airline/OTA system 103.

Ranking module 138 may execute a pre-programmed ranking algorithm that, given a current user who browses for flights or selected a flight, and given a list of passengers on a flight who consented to share their social information, may rank such passengers in a particular order. Ranking module may include one or more sub-modules, for example, a social relevance score calculator 139, a common traits identifier 140, a weight allocator 141, and a self-learning algorithm updater 142.

Social relevance score calculator 139 may calculate a social relevance score per each one of the passengers relative to the browsing user. The social relevance score may be used for one or more purposes, for example, for ordering of the passenger list displayed to the browsing user, for suggesting a seat-mate or a flight neighbor to the browsing user, for suggesting to the browsing user one or more passengers as potential acquaintances or as candidates for befriending, or the like.

Common traits identifier 140 may search for and identify common traits between the browsing user and fellow passengers. A common trait may be, for example, attending the same high school or college or university or other educational institution; working in the present or in the past for the same employer; living now or in the past in the same town or city or state or country; having a common age (e.g., 37) or age-group (e.g., 36 to 40); having a common profession (e.g., patent attorney, or Cobol programmer); having a common hobby or interest; having performed a "like" operation to a common entity or item; or other suitable traits.

Weight allocator 141 may allocate different weights to various traits, or may increase the social relevance score multiple times if the common trait repeats. For example, given the current user and a passenger on the same flight, the ranking algorithm may identify similar traits between the two passengers; a social relevance score may be updated, such that each trait holds a weight, and for each common trait the relevancy score may be increased by the weight associated with that trait. For example, if the two users have three common friends and the two users also attended the same university, then the social relevance score may be calculated as: three times the weight for a common friend, plus one time the weight for a common university. Weights may differ among traits; for example, having a common friend may have a weight of five, whereas attending the same university may have a weight of two. Other suitable weights and multipliers may be used.

Self-learning algorithm updater 141 may update or modify the ranking algorithm based on self-learning, or may update or modify the weights allocated to common traits by taking into account actions of the user. For example, the user may select a flight seat neighboring another passenger, and the ranking algorithm may compare their traits and may identify common traits. The algorithm may utilize an assumption that since the user chose to seat next to that particular passenger, the common traits may be significant. Therefore, the weight of these common traits may be increased with regard to this user, or with regard to this user and the other particular passenger. For example, the ranking algorithm may deduce that since Adam selected to seat next to Bob, and their common trait is attendance in a common college, then this trait may be significant to Adam; and in a subsequent flight of Adam, ranking of passengers may be performed by taking into account that Adam allocates a higher weight to attendance of a common college (rather than, for example, having the same age). Similar calculations may be applied to all the users on the flight. Optionally, if a user selects one flight over another flight, it may be due to the social traits of people on this flight, even ones that do not seat next to him. Therefore, common traits with all the passengers on a flight may be increased in weight, although in a smaller amount than in the case of two passengers who seat next to each other. Traits that appear in search results but were not acted upon, may have their weights decreased upon each additional iteration of the ranking algorithm.

Ranking module 138 may handle traits on two (or more) separate levels: at a level of general traits (e.g., two passengers attended the same university), and at a level of instances of traits (e.g., two passengers attended Harvard University). Each trait in each level may have its own weight, and both weights on both levels may be taken into account when calculating the social relevancy score. Optionally, more than two levels may be used; for example, a third level (e.g., two passengers attended the Law School of Harvard University), a fourth level (e.g., they both attended the law school in 2005), or the like.

The calculated social relevancy score may be a number having relative significance when compared to another social relevancy score. Optionally, the social relevancy score (or a normalized or weighted version thereof) may be displayed to the user; for example, the social relevance score divided by a maximum possible score may be presented, to indicate to the user the level of relevancy of other passengers.

Feedback module 153 may be used for gathering or obtaining feedback from passengers after they completed a flight (e.g., the flight itself, rather than the flight reservation process). After a user takes his flight, feedback module 153 may follow-up with the user to obtain user feedback regarding the other passengers that the user sat with or chose to sit with. Such structured feedback may then be used in the calculation of social relevance score or match scores with other users. Furthermore, feedback module 153 may allow a user to provide feedback on his own preferences as to the passengers he seats next to, and may take such feedback into account. For example, if the feedback from one or more users is that passenger Adam is good at keeping a business conversation, and user Bob states that he is interested in business conversation, then the match score between these two users may be increased. The feedback that a first user may provide on a second user may further refer to the way that the second user behaved during the flight, for example, indicating that the second user was talking excessively, was noisy, was snoring, was friendly, was unfriendly, had a positive or negative level of hygiene or odor, or the like.

Matching module 143 may provide to a prospective passenger recommendations for matched passengers on his flight, e.g., showing to the user the social information of "fellow passengers that may interest you" or "fellow passengers that may be the most interesting for you". Identification of matching users may be based on the social relevance score. For example, after calculating the social relevance score of all the users on a flight, a matching algorithm may choose and may display to the user the passengers having the top 3 or 5 (or other suitable number of) social relevance score, or the passengers having the top 10% of other percentile of the social relevance score. Optionally, users may be matched and displayed based on their connection levels, for example, direct friends, friends of friends or second-degree friends, third-degree friends, people with multiple common traits or interests, people with a single common trait or interest, or other suitable levels of matching.

It is noted that feedback module 143 may be able to operate bi-directionally, and may be able to send notifications to a passenger with regard to changes in the seat map of his flight. In a first example, Adam may select seat 27-D in a flight, next to seat 27-E which may be already occupied by Bob, and next to seat 27-C which may remain available. Subsequently, seat 27-C may be occupied (e.g., reserved) by Charles, and feedback module 143 may send a notification to Adam to alert him that seat 27-C next to his seat 27-D changed from available to occupied, and augmenting such notification with the social information of Charles as obtained from social network 104. Similarly, Bob may change his seat selection, and a similar notification may be sent to Adam, to alert Adam to the change in occupancy of seat 27-E, the notification including social information of the "departing" neighbor and/or of a new neighbor that took his place. In another example, Adam may request to receive hourly, daily, or weekly updates with regard to seat selection (or seat selection modification) in the entire flight and/or in particular regions of the seat map, the notification including social information of new passengers or of passengers who changed their selected seat(s). Notifications may be delivered to passengers by electronic mail, by text messages or SMS messages, by voice messages (e.g., using a text-to-speech converter), or by other suitable ways.

Statistics module 171 may perform statistical analysis on data (including seat assignment and/or social information) associated with passengers on a particular flight, or on a batch or set of flights (e.g., all the instances of flight number 93 in a particular week or month; or all flights from Boston to Los Angeles in a particular day or week), and may generate statistical insights and/or statistical results, e.g., demographic insights, which may be reported to an airline or an OTA using reporting module 172. For example, reporting module 172 may allow an airline/OTA to obtain demographic insights which may be shown as text, numbers, pie-charts, graphs, or other suitable reporting elements or comparison elements. In a first example, reporting module 172 may report to airline/OTA that on a monthly basis, 78 percent of passengers from Boston to Miami are 60 years old or older; and the airline/OTA may utilize such insight, for example, for targeted advertising in magazines that cater to senior citizens in the Boston area. In a second example, reporting module may report to airline/OTA that in a certain month, 68 percent of passengers on a particular flight (e.g., morning flight from Dallas to Newark) are females; or that 55 percent of passengers in general are from a particular industry (e.g., the legal industry, or the medical industry), and such insights may again be used for targeted marketing campaigns or for other suitable purposes.

Social information merger 144 may allow ISA 102 to receive social information from multiple social networks, may merge or unify them, and may provide the aggregated information in a uniform or normalized manner. Social information merger 144 may utilize social network precedence rule(s) to resolve conflicts between social information obtained from two or more social networks. For example, a user may be connected to several social networks, as some parts of the social information about the user may be obtained from multiple social networks. When this information is singular or unique, for example, the user name or gender or age, the information from several networks may be different and may present a conflict. ISA 102 may resolve this by ordering the social networks and giving precedence to the data received from higher social networks, based on pre-defined rule(s). In a demonstrative example, a set of rules may be that LinkedIn social information prevails over Facebook social information; that LinkedIn social information prevails over Google Plus social information; and that Facebook social information prevails over Google Plus social information. Optionally, the rules may be available for the user to inspect, review, and/or modify; and the user may optionally be able to delete rules, add rules, or modify rules (e.g., a particular user may decide that Facebook information prevails over all other social networks information).

Privacy module 145 may ensure that privacy settings of users are respected, such that ISA 102 may not present more information than social network 104 allows according to the user's privacy settings at social network 104. However, ISA 102 may allow the user to narrow down the list of people who may view his social information on the context of ISA 102, for example, by defining user groups according to the social network semantics (e.g., Facebook "friends", LinkedIn "First Degree Contacts", or the like). The user may then define which groups may or may not see his social information in a flight-related context. The configuration may be set for the entirety of the user's social information according to a network-specific group of users, e.g., as defined using a social network specific terminology (for example, a group of "friends" on Facebook, a group of "contacts" on LinkedIn).

ISA 102 may connect between users in different social networks. ISA 102 may allow users to see each other based on their privacy settings, and may allow a user who is logged-in with a first social network (e.g., Facebook) to see also users from a second social network (e.g., LinkedIn), as long as all such users consented to share their social information for flight-related purposes. Optionally, this may be allowed when the social network privacy settings of a user allow anonymous users to see the social information of that user on that social network, and/or when the relevant policies or settings of the social network permit sharing of social information with users who are not members of that social network and/or with users who are not logged-in into the social network.

ISA 102 may allow the user to provide information about himself on top of the information retrieved from social networks, for example, by presenting the user a form in which he can fill-in information about himself. This form may be presented immediately after signing into ISA 102 with a particular social network, and/or by accessing the ISA 102 user profile page and entering the details there. According to the social network's policy, the form may be pre-populated with details that the user provided in the social network. In the form, the user may override details that he provided on the social network and may also add details that he did not provide in the social network. The information that the user entered in this form may be displayed as part of the user's shared social information, similar to other social network information. Since the details entered in this form may differ from the details entered by the user in social networks, ISA 102 may use the network precedence mechanism or rules as described above to resolve possible conflicts. For example, data entered in the ISA 102 user information form may be treated as data obtained from an external social network; and its precedence may be predetermined (e.g., it may prevail over any other social network) or may be configured by the user.

ISA 102 may further allow sharing of information among two more airline websites, or two more OTA websites, or a combination of airline website(s) and OTA website(s). For example, some airlines may share flights between themselves (e.g., known as "code sharing") and with OTAs; and thus, ISA 102 may provide a way for such multiple clients to access and update the seating data on mutual flights. Since flight tickets may be sold in parallel by multiple clients, ISA 102 may allow placement of logged-in users on a flight even if it was done by different clients or entities or websites. For example, some users on a flight may purchase the tickets on the airline's website (e.g., United.com), whereas some users may purchase the tickets for the same flight on a first OTA website (e.g., Expedia.com), and whereas additional users may purchase the tickets for the same flight on another OTA website (e.g., Orbitz.com). Still, all these passengers may be able to see each other's images and social information, based on their privacy settings.

Optionally, ISA 102 may be associated with or may include search Application Programming Interface (API) 146, which may receive an input an airline (or carrier) identifier, a flight number identifier, and a date in which the flight is scheduled. Search API may provide output including, for example, social information and images of passengers on that flight. ISA 102 may further utilize a service (e.g., third party service) to obtain a list of flights and to allow users to choose seats in flights. Any permitted client application may utilize the search API to get the flight object and to apply to it the seating social information. The carrier and flight number may differ in the case of airline code sharing, and thus ISA 102 may utilize a mapping or a lookup table or conversion table of code sharing information.

ISA 102 may allow social information enhancements, for example, may allow a client to add social information to objects other than flights. For example, ISA 102 may be used for adding social information for hotel reservation options (e.g., in an airline website, an OTA website, or a hotel booking website). A logged-in user on an airline website may be presented with a social widget, similar to the flight seating social widget, at the area of the website dedicated for hotel reservation, notifying the user about other users who chose to book a hotel through the website. Similarly, ISA 102 or a similar social information module or application may be used to show to a user the social information and images of other users who joined the frequent flier program, of users who rented a car through the airline (or OTA) website, of users who upgraded from coach to business class, or the like. ISA 102 may achieve this by leveraging a "container" model utilized for flight social information, in which ISA 102 regards each particular flight as a container of seated users. A similar model may apply to other object(s) in an airline or OTA website. For example, ISA 102 may treat the hotel reservation option as a container of users who book rooms in a particular hotel for a particular date. The container may be initiated by the airline or OTA website and may be populated by users who make their hotel reservation through such website. Once a new logged-in user views this section, he may view this information in the same way he would view the social information of other passengers in a flight.

In some embodiments of the present invention, social information corresponding to two or more passengers of a particular flight may be obtained "in bulk" or as a batch, by utilizing a single query (rather than by using multiple queries) which identifies the flight (e.g., identifying the airline, a flight number, and a flight date). The query may not identify by his real name or by other real-life identifier (e.g., passport number) or even by a virtual name (e.g., a social network nickname or username) any passenger(s) on said flight. The social information may be obtained in bulk from a source external to an airline/OTA system or website, rather than by building or creating from the ground up, within the airline/OTA system, a list of passengers on a flight while associating between a real-life name and a social-network-nickname of each passenger.

Although portions of the discussion herein may relate, for demonstrative purposes, to sharing of social information among users who book a flight on an airplane, the present invention may be utilized in conjunction with other industries or applications, for example, sharing of social information among users who book a cruise on a boat (e.g., on Carnival Cruise), sharing of social information among users who book a hotel reservation (e.g., on Hilton) or at a vacation resort (e.g., Club Med), sharing of social information among users who book a vehicular trip (e.g., Greyhound) or a train grip (e.g., Amtrac), sharing of social information among users who book a reservation or purchase ticket(s) for a sporting event or a theater show or a movie, sharing of social information among users who reserve a place at a restaurant or bar, or the like.

The term "social network" as used herein may include, for example, a website or an Internet-based service which allows users to create and maintain a personal profile or personal page, to befriend or to "like" or to "follow" other users, to share textual and/or graphical information with other users, to perform blogging or micro-blogging activities, or the like. Demonstrative social networks may include, for example, Facebook, LinkedIn, Twitter, Google Plus, Pinterest, or the like.

The term "social information" as used herein may include one or more information items or data items, which may be textual and/or graphical, and which may typically be found on a user profile or a user page at a social network. Social information may include, for example, an image or photograph of a user, a gender, an age, an age group, a profession, an occupation, a current employer, a past employer, a school or college or university attended by the user, a hobby or interest of the user, a city or state or country in which the user lives or originates, a marital status or family status of a user, data indicating which other users or entities a particular user "liked" or "followed" or "befriended" in a social network, or the like.

The terms "passenger" or "traveler" or "user" as used herein may include, for example, a person who reserved a flight or a trip; a person who intends to reserve a flight or a trip; a person who is browsing for flights or trips; a person who is searching for flights or trips; a user of an airline website; a user of an OTA website; a person who booked a flight or trip but did not yet choose a seat; a person who booked a flight or trip and already selected a seat; a prospective passenger; a person who considers being a passenger; a person who intends to be a passenger; a person who purchased a flight ticket; a person who purchased a flight ticket, or is in the process of purchasing a flight ticket, and is performing seat selection or online seat selection; a person who is in the process of performing a check-in or an online check-in; a person who is in the process of obtaining or printing a boarding pass for a flight; a person who is modifying a previously-selected seat or a previously-assigned seat; or the like. The terms "traveler", "passenger" and "user" may be used interchangeably herein.

The term "social widget" as used herein may include, for example, a widget or application or applet or program, which may be associated with one or more social networks, and/or may be able to access information on a social network or on ISA 102, and/or may be operable in conjunction with a social network or with ISA 102, and/or may obtain or receive input from a social network or from a user's profile or user's page on a social network or from ISA 102, and/or may generate output usable through or on a social network or on ISA 102, and/or may generate output which incorporates social information of users of a social network.

The terms "mock social widget" or "mock widget" as used herein may include, for example, a fake or pretend or artificial or non-working or non-operational social widget; a partially-working or partially-operational social widget; a social widget in which one or more features are operational and one or more other features are not operational; an image or animation of a social widget; a graphical or textual element which resembles a fully-working social widget; or other suitable component or widget or interface element that may be used to encourage or elicit or attract a user to log-in to the service in order to see an actual (or fully-working, or non-fake) social widget with real data and/or full data.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments of the present invention may take the form of an entirely hardware embodiment, an entirely software embodiment, or an embodiment including both hardware and software elements. Some embodiments of the present invention may be implemented in software, firmware, resident software, microcode, an application which may be downloaded and/or installed by a user, an application which may run in a browser, a client-side application, a server-side application, a client-server application, or the like. Some embodiments of the present invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system or device. Some embodiments of the present invention may be implemented, for example, using a machine-readable medium or article which may store an instruction or a set of instructions that, if executed by a machine, cause the machine (e.g., a computer or an electronic device) to perform a method and/or operations described herein.

Some embodiments of the present invention may include or may utilize, for example, a processor, a central processing unit (CPU), a digital signal processor (DSP), a controller, an integrated circuit (IC), a memory unit, a storage unit, input units, output units, wired and/or wireless communication units, an operating system, and other suitable hardware components and/or software modules.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method of sharing social information, the method comprising:
  obtaining from a social network social information of passengers associated with a flight;
  calculating a social relevance score for each one of said passengers associated with said flight;
  ranking said passengers based on said social relevance score;
  presenting said social information to a prospective passenger of said flight;
  wherein the steps of calculating the social relevance score and ranking the passengers further comprise:
    (a) identifying personal traits of a browsing user and of a passenger on said flight;
    (b) allocating weights to said personal traits;
    (c) updating the social relevance score, which indicates social relevance of said passenger to said browsing user, by performing: for each personal trait that is common to both the browsing user and said passenger, increasing the social relevance score by a weight allocated to said personal trait that is common;
    (d) subsequently, utilizing a self-learning algorithm to update weights allocated to common traits of the browsing user, based on prior seat selections of the browsing user;
  wherein the method is implementable by utilizing an electronic system that comprises at least a hardware component.

2. The method of claim 1, wherein the obtaining comprises:
  obtaining from the social network in bulk social information of at least two passengers associated with a flight.

3. The method of claim 1, wherein the obtaining comprises:
  sending a query which includes an identifier of said flight, and which excludes any identifier of any passenger on said flight.

4. The method of claim 3, wherein the obtaining comprises:
  in response to a single query identifying only a particular flight, obtaining a batch of social information items of at least two passengers on said particular flight.

5. The method of claim 1, wherein the presenting comprises:
  presenting a seating map for said flight indicating available seats and occupied seats; and
  for at least one occupied seat, presenting social information of a passenger occupying said occupied seat.

6. The method of claim 1, comprising:
  receiving flight identification data from a flight booking system;
  obtaining social information of passengers for said flight;
  serving to said flight booking system said social information.

7. The method of claim 1, comprising:
  establishing a first instance of Oauth protocol with a social network, comprising: assigning to the social network a role of a server, and assigning to an intermediate module a role of a client; and
  establishing a second, separate, instance of OAuth protocol with a flight booking system, comprising: assigning to the intermediate module a role of a server, and assigning to the flight booking system a role of a client.

8. The method of claim 1, comprising:
  displaying a flight search result page which comprises: identifiers of one or more flights, and social information of passengers in each one of said one or more flights.

9. The method of claim 1, comprising:
  presenting a seating map for said flight indicating available seats and occupied seats; and
  presenting near the seating map a social widget for displaying social information of passengers in said flight.

10. The method of claim 1, comprising:
presenting a mock widget to elicit a user to log-in into a service which permits said user to share social information with other passengers on said flight.

11. The method of claim 1, comprising:
displaying a seat map of said flight, the seat map indicating which one or more seats are available and which one or more seats are reserved; and
upon a user pointing at a reserved seat on said seat map, displaying social information of a passenger that reserved said seat.

12. The method of claim 1, comprising:
displaying a seat map of said flight, the seat map indicating which one or more seats are available and which one or more seats are reserved; and
for at least one seat that is reserved, displaying at a location of said seat in the seat map an image of a passenger that reserved said seat.

13. The method of claim 1, wherein obtaining comprises:
obtaining social information of at least a first passenger and a second passenger on said flight, wherein the first passenger is a passenger who booked the flight through a website of an airline that operates said flight, and wherein the second passenger is a passenger who booked the flight through a website external to the website of said airline that operates said flight.

14. The method of claim 1, comprising:
suggesting to said prospective passenger a seat in said flight, based on one or more common traits identified by matching between social information of said prospective passenger and social information of other one or more passengers on said flights.

15. The method of claim 1, wherein the suggesting comprises:
taking into account a feedback received from said prospective passenger regarding a previously-performed seat selection that was based on social information in a previous flight.

16. The method of claim 1, comprising:
sending to said prospective passenger a notification indicating a change in seating assignment of another passenger on said flight, the notification indicating a seat of said other passenger on said flight and further including social network information of said other passenger.

17. The method of claim 1, wherein the step of utilizing the self-learning algorithm to update weights allocated to common traits, comprises:
identifying a personal trait, that was common to the browsing user and to one or more passengers of said flight, and that was used in displaying to the browsing user a ranked list of passengers of said flight;
detecting that the browsing user did not act upon said personal trait;
in subsequent iterations of said browsing user, decreasing a weight allocated to said personal trait for purposes of calculating the social relevance score.

18. The method of claim 1, wherein the ranking comprises:
calculating values of the social relevance score, between (i) the browsing passenger and (ii) each passenger on said flight that agreed to share its social networking data;
displaying to the browsing user, the passengers on said flight that have the top N values of social relevance score, sorted based on values of social relevance scores, wherein N is a positive integer.

19. The method of claim 1, wherein the ranking comprises:
calculating values of the social relevance score, between (i) the browsing passenger and (ii) each passenger on said flight that agreed to share its social networking data;
displaying to the browsing user, a seating map indicating all the passengers on said flight that consented to sharing their social networking data; wherein an indication of each of said passengers is accompanied by a normalized value of the social relevance score that indicates the social relevancy of each one of said passengers to the browsing user.

20. The method of claim 1, further comprising:
receiving from the browsing user a seat selection for said flight;
reserving said seat selection on said flight for the browsing user;
subsequently,
(A) monitoring changes in occupancy of nearby seats that are adjacent to the seat selected by the browsing user;
(B) generating an electronic notification to the browsing user, indicating that a nearby seat that was adjacent to the seat selected by the browsing user, has been occupied by a particular passenger since the time the browsing user reserved his seat selection;
(C) calculating the social relevance score of the particular passenger, that chose to occupy said nearby seat;
(D) indicating in said notification to the browsing user, the calculated social relevance score of said particular passenger relative to the browsing user.

* * * * *